US012485361B1

United States Patent
Wang

(10) Patent No.: US 12,485,361 B1
(45) Date of Patent: Dec. 2, 2025

(54) TOY ATOMIZATION POT

(71) Applicant: Guangdong Yile Toys Co., LTD, Guangdong (CN)

(72) Inventor: Ruiqian Wang, Guangdong (CN)

(73) Assignee: Guangdogn Yile Toys Co., LTD, Shantou (CN)

( * ) Notice: Subject to any disclaimer, the term of this patent is extended or adjusted under 35 U.S.C. 154(b) by 0 days.

(21) Appl. No.: 19/284,985

(22) Filed: Jul. 30, 2025

(30) Foreign Application Priority Data

Jul. 15, 2025 (CN) .......................... 202521483722.7

(51) Int. Cl.
- *A63H 33/26* (2006.01)
- *A61L 9/14* (2006.01)
- *A63H 33/28* (2006.01)

(52) U.S. Cl.
CPC ................ *A63H 33/26* (2013.01); *A61L 9/14* (2013.01); *A63H 33/28* (2013.01)

(58) Field of Classification Search
CPC ........ A63H 33/22; A63H 33/26; A63H 33/28; A61L 9/14; B05B 17/0607
See application file for complete search history.

(56) References Cited

U.S. PATENT DOCUMENTS

| | | | | |
|---|---|---|---|---|
| 4,116,387 A | * | 9/1978 | Kremer, Jr. ........... | B05B 7/0012 261/78.2 |
| 6,676,271 B2 | * | 1/2004 | Kohn ...................... | F24F 6/00 362/253 |
| 8,029,153 B2 | * | 10/2011 | Jorgensen ................. | A61L 9/14 362/253 |
| 8,529,078 B2 | * | 9/2013 | Lee ........................... | F21V 1/16 222/113 |
| 11,173,225 B2 | * | 11/2021 | Shin ........................ | A61L 9/122 |
| 11,628,463 B2 | * | 4/2023 | Hsiao ....................... | F24F 8/50 392/403 |
| 2006/0250795 A1 | * | 11/2006 | Langone .................. | B65D 83/75 222/113 |
| 2008/0036332 A1 | * | 2/2008 | Helf .......................... | A61L 9/14 310/311 |
| 2008/0085657 A1 | | 4/2008 | Watanabe et al. | |
| 2014/0334801 A1 | * | 11/2014 | Browder ............ | F21V 33/0004 392/390 |
| 2017/0281821 A1 | | 10/2017 | Davis, II et al. | |
| 2022/0078939 A1 | * | 3/2022 | Goncalves-Da-Costa ................... | H05K 7/2049 |
| 2023/0158191 A1 | * | 5/2023 | Grinstead .................. | A61L 2/24 422/5 |
| 2023/0292712 A1 | | 9/2023 | Wilhelm et al. | |
| 2024/0240814 A1 | * | 7/2024 | Li ............................ | A61L 9/14 |

* cited by examiner

*Primary Examiner* — John A Ricci

(57) ABSTRACT

A toy atomization pot includes a detachable inner container. An accommodation space is provided inside the inner container, and an opening is provided in a side of the accommodation space. A cap body is detachably arranged at the opening; and the cap body includes a control circuit board, a water storage tank, an atomizing sheet, a plurality of lamp beads, a toggle switch, a sound vibration switch, and a tactile switch. A water outlet of the water storage tank may communicate with the accommodation space through the opening; the atomizing sheet is arranged at the water outlet and electrically connected to the control circuit board; the plurality of lamp beads are electrically connected to the control circuit board respectively; and the toggle switch, the sound vibration switch, and the tactile switch are electrically connected to the control circuit board respectively.

7 Claims, 7 Drawing Sheets

TOY ATOMIZATION POT

CROSS REFERENCE TO RELATED APPLICATIONS

This application claims priority benefits to Chinese Patent Application No. 2025214837227, filed on Jul. 15, 2025, the contents of which is incorporated herein by reference.

TECHNICAL FIELD

The present disclosure relates to the technical field of electronic toys, and in particular, to a toy atomization pot.

BACKGROUND

Toys are essential items in the growth development of every child and come in many varieties. Many toys can spark the curiosity of children and guide them to learn some knowledge while playing. For example, some types of pot toys may demonstrate physical or chemical phenomena, allowing the children to gain insight into scientific principles. These types of toys often feature atomization functions.

SUMMARY

The present disclosure is intended to provide a toy atomization pot. The toy atomization pot has functions of charging, sound, lighting, and atomization, and these functions of lighting, sound and atomization are individually controlled through a toggle switch, a tactile switch, and a sound vibration switch, thereby greatly improving the playability.

In order to achieve the above objective, the present disclosure provides the following technical solutions.

The present disclosure provides a toy atomization pot. The toy atomization pot includes a pot body and a cap body; a detachable inner container is arranged inside the pot body, an accommodation space is provided inside the inner container, an opening is provided in a side of the accommodation space, and the accommodation space may communicate with the outside through the opening; the cap body is detachably arranged at the opening to seal the accommodation space; and the cap body internally includes a control circuit board, a water storage tank, an atomizing sheet, a plurality of lamp beads, a toggle switch, a sound vibration switch, and a tactile switch. A water outlet of the water storage tank may communicate with the accommodation space through the opening; the atomizing sheet is arranged at the water outlet and electrically connected to the control circuit board; the plurality of lamp beads are electrically connected to the control circuit board respectively; the toggle switch is electrically connected to the control circuit board and configured to switch the control circuit board on or off; the sound vibration switch is electrically connected to the control circuit board and configured to control the plurality of lamp beads and the atomizing sheet; and the tactile switch is electrically connected to the control circuit board and configured to control the plurality of lamp beads and the atomizing sheet. When the cap body seals the opening and the toggle switch is in an on state, the tactile switch is in an on state, and the sound vibration switch is in a triggerable state.

In some implementation solutions of the toy atomization pot provided in the present disclosure, the cap body includes a housing, a circuit board mounting groove, a vibration switch mounting groove, a water tank mounting groove, and a light strip mounting groove surrounding the water tank mounting groove are provided inside the housing, and a through hole is provided in the bottom of the water tank mounting groove; the control circuit board is arranged in the circuit board mounting groove; the sound vibration switch is arranged in the vibration switch mounting groove; the water storage tank is arranged in the water tank mounting groove, and a water inlet tube of the water storage tank passes through the through hole to enable a water filling port of the water storage tank to communicate with the outside; and the cap body further includes an annular light strip internally, the annular light strip is arranged in the light strip mounting groove, and the plurality of lamp beads are uniformly distributed along the circular lamp strip.

In some implementation solutions of the toy atomization pot provided in the present disclosure, the cap body further includes a rechargeable battery internally, a battery mounting groove is also provided inside the housing, and the rechargeable battery is arranged in the battery mounting groove and electrically connected to the control circuit board through the toggle switch; and a charging interface is provided in the control circuit board and configured to charge the rechargeable battery.

In some implementation solutions of the toy atomization pot provided in the present disclosure, the cap body further includes a plurality of lampshades internally, the plurality of lampshades are in one-to-one correspondence with the plurality of lamp beads, and each of the plurality of lampshades covers the corresponding lamp bead.

In some implementation solutions of the toy atomization pot provided in the present disclosure, the cap body further includes a loudspeaker internally, a loudspeaker mounting groove is also provided inside the housing, and the loudspeaker is arranged in the loudspeaker mounting groove and electrically connected to the control circuit board through the tactile switch and the sound vibration switch.

In some implementation solutions of the toy atomization pot provided in the present disclosure, the cap body further includes a cap handle, the water inlet tube passes through the through hole to a top side of the housing, and the cap handle is inserted into a top end of the water inlet tube to seal the water filling port.

In some implementation solutions of the toy atomization pot provided in the present disclosure, at least one annular hole is provided in a circumferential side of the pot body, and a pot handle is hinged with each of the annular holes.

BRIEF DESCRIPTION OF THE DRAWINGS

The accompanying drawings, which form part of the present application, are configured to provide a further understanding of the present disclosure. The exemplary embodiments of the present disclosure and the description thereof are configured to explain the present disclosure, but do not constitute improper limitations to the present disclosure.

Figure 1:
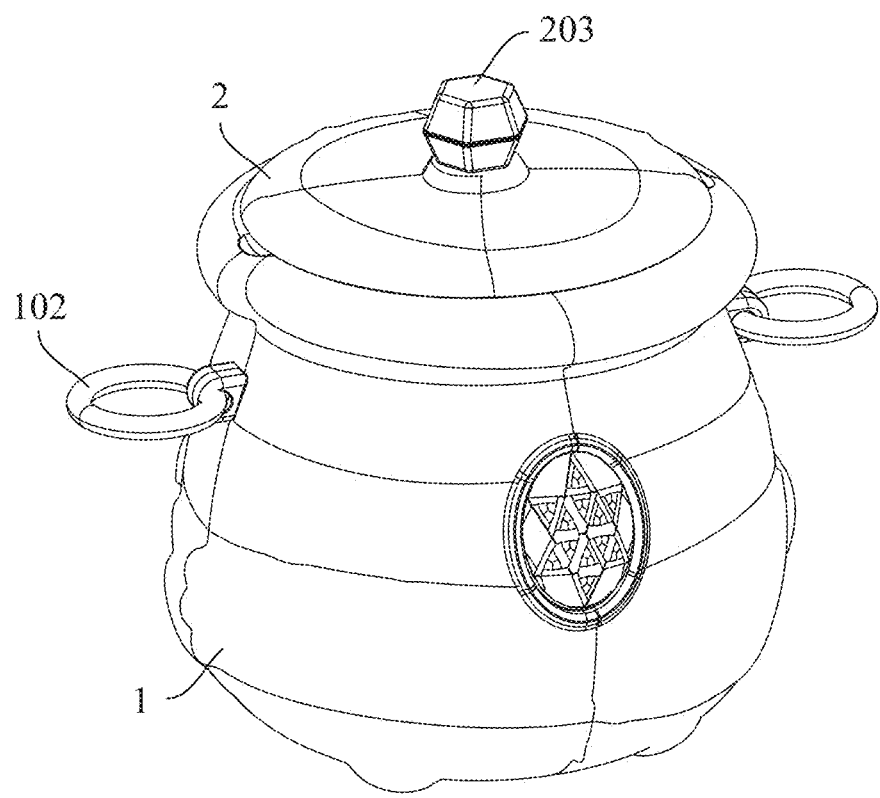
FIG. 1 is a perspective view of a toy atomization pot according to an embodiment of the present disclosure.

Reference numerals description: 1. Pot body; 101. Inner container; 101*a*. Opening; 101*b*. Accommodation space; 101*c*. Annular hole; 102. Pot handle; 2. Cap body; 201. Housing; 201*a*. Water tank mounting groove; 201*b*. Through hole; 201*c*. Circuit board mounting groove; 201*d*. Light strip mounting groove; 201*e*. Battery mounting groove; 201*f*. Vibration switch mounting groove; 201*g*. Loudspeaker mounting groove; 202. Water storage tank; 202*a*. Water inlet tube; 202*b*. Water filling port; 202*c*. Water outlet; 202*d*. Atomizing sheet; 202*e*. Adhesive injection groove; 202*f*. First scaling ring; 202*g*. Second sealing ring; 203. Cap handle; 203*a*. Insertion groove; 204. Control circuit board; 204*a*. Charging interface; 204*b*. Silica gel stopper; 204*c*. Toggle switch; 204*d*. Silica gel sleeve; 204*e*. Tactile switch; 205. Rechargeable battery; 206. Sound vibration switch; 207. Annular light strip; 207*a*. Lamp bead; 208. Annular strip; 208*a*. Lampshade; 209. Loudspeaker; 210. Loudspeaker fixing rack.

DETAILED DESCRIPTION OF THE EMBODIMENTS

The present disclosure will be described below in detail with reference to the accompanying drawings and the embodiments. Each example is provided by means of explanation of the present disclosure and is not intended to limit the present disclosure. In fact, those skilled in the art will appreciate that modifications and variations may be made to the present disclosure without departing from the scope or spirit thereof. For example, features shown or described as part of one embodiment may be used in another embodiment to yield yet another embodiment. Therefore, it is expected that the present disclosure includes such modifications and variations within the scope of the appended claims and equivalents thereof.

In the descriptions of the present disclosure, direction or position relationships indicated by terms such as "longitudinal," "transversal," "upper", "lower", "front," "rear," "left", "right", "vertical", "horizontal", "top," and "bottom" are direction or position relationships based on the accompanying drawings, and are merely intended to facilitate the descriptions of the present disclosure, rather than requiring the present disclosure to be constructed and operated in a specific direction. Therefore, these terms should not be interpreted as limiting the present disclosure. The terms "connected," "connection," and "arrange" used in the present disclosure should be understood in a broad sense. For example, the term "connection" may refer to fixed connection or detachable connection; the term "connection" may refer to direct connection or indirect connection through intermediate components; and the term "connection" may refer to wired connection, wireless connection, or wireless communication signal connection. For those of ordinary skill in the art, the specific meanings of the above terms may be understood according to the specific situations.

One or more examples of the present disclosure are shown in the accompanying drawings. Detailed description uses numerals and alphabetic labels to refer to features in the drawings. Similar or analogous numerals in the accompanying drawings and descriptions have been configured to refer to similar or analogous parts of the present disclosure. As used herein, the terms "first," "second," "third," etc., are interchangeably configured to distinguish one component from another and are not intended to indicate the position or importance of individual components.

Embodiment

Figure 2:
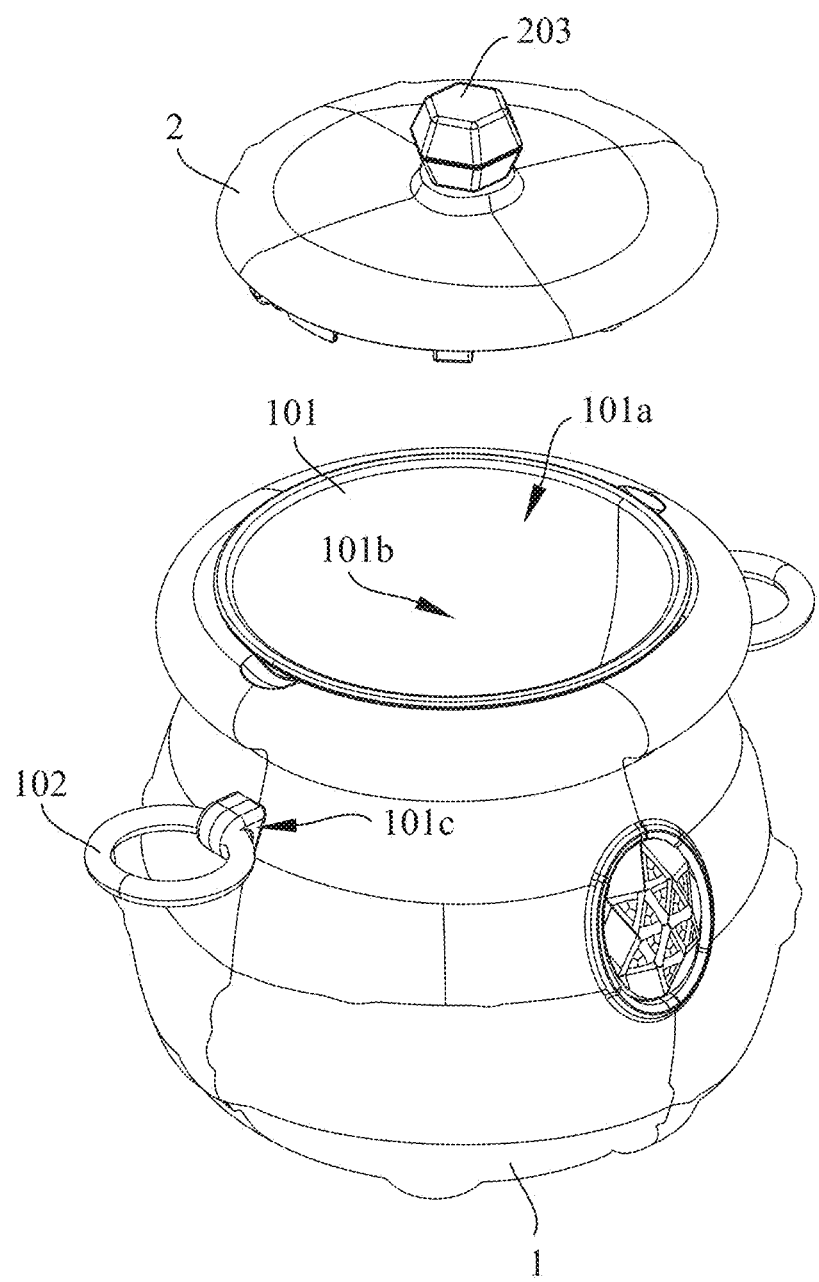
FIG. 2 is a partially exploded perspective view of the toy atomization pot at a first angle according to an embodiment of the present disclosure.
Figure 3:
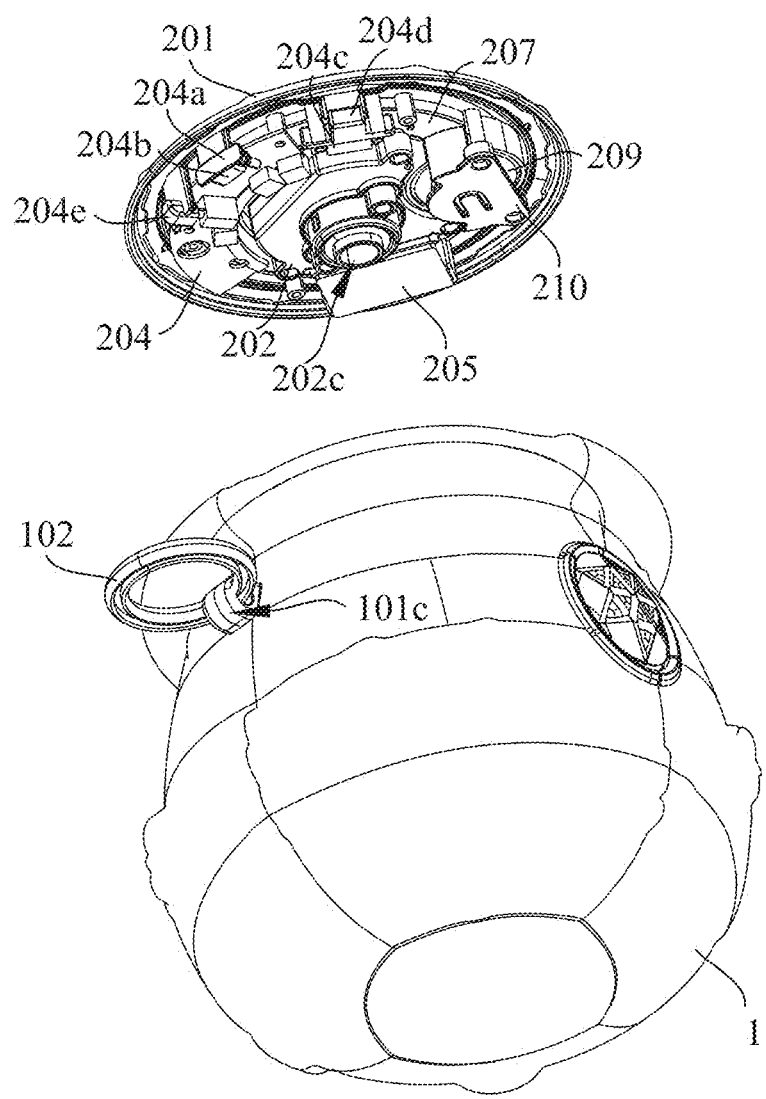
FIG. 3 is a partially exploded perspective view of the toy atomization pot at a second angle according to an embodiment of the present disclosure.
Figure 4:
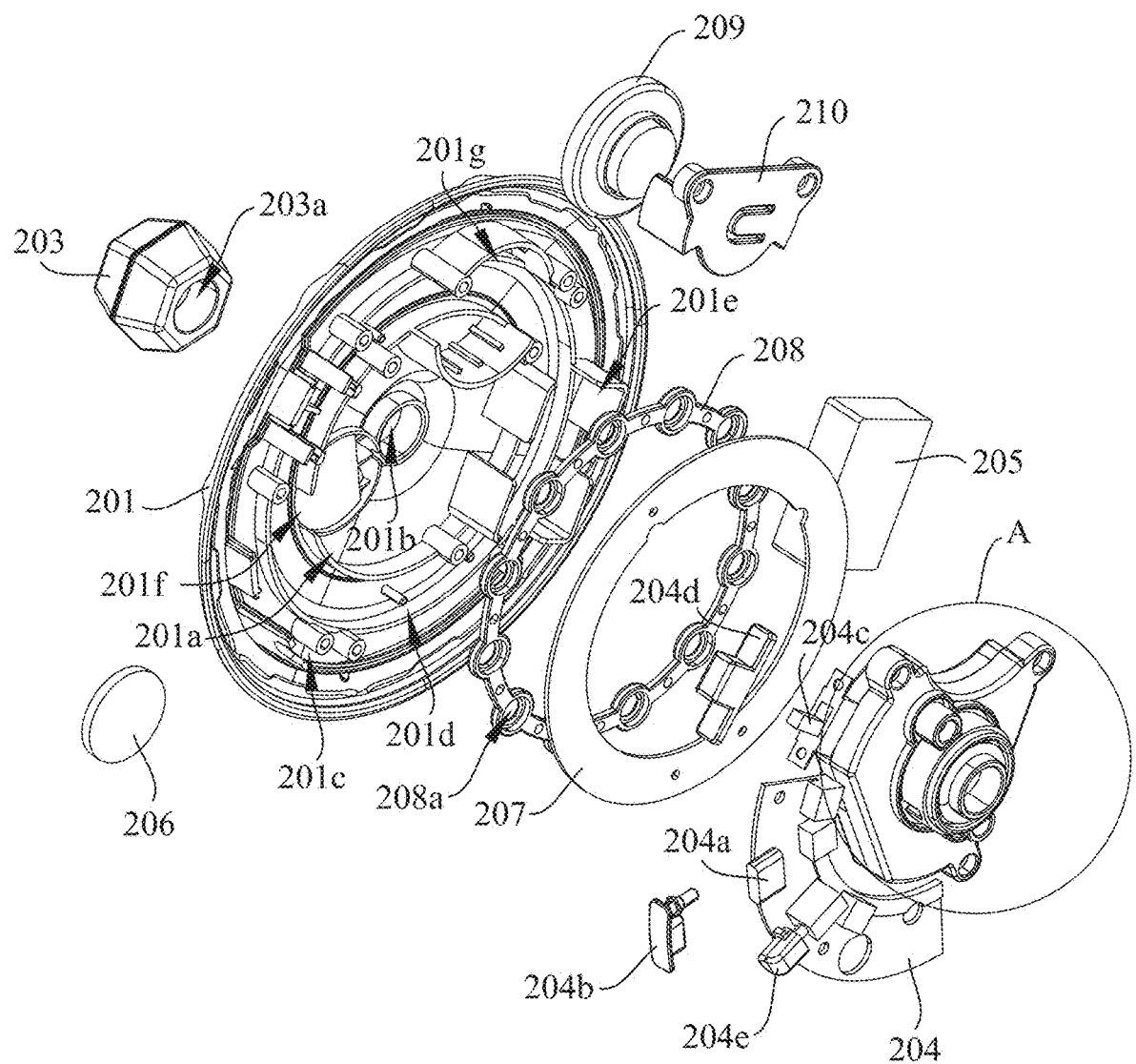
FIG. 4 is a partially exploded perspective view of a cap body in the toy atomization pot at a first angle according to an embodiment of the present disclosure.
Figure 5:
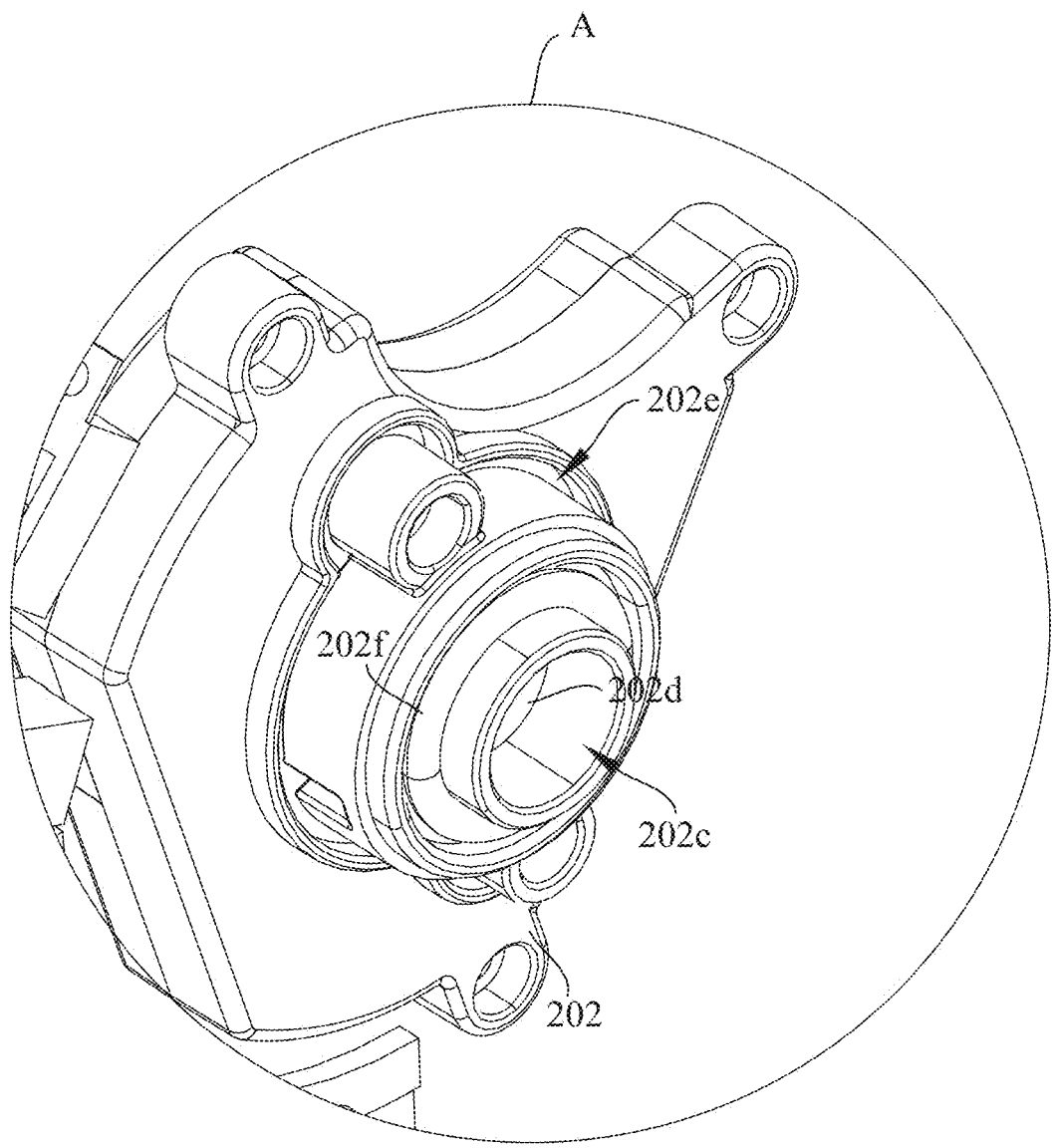
FIG. 5 is a partially enlarged perspective view of a portion A in FIG. 4.
Figure 6:
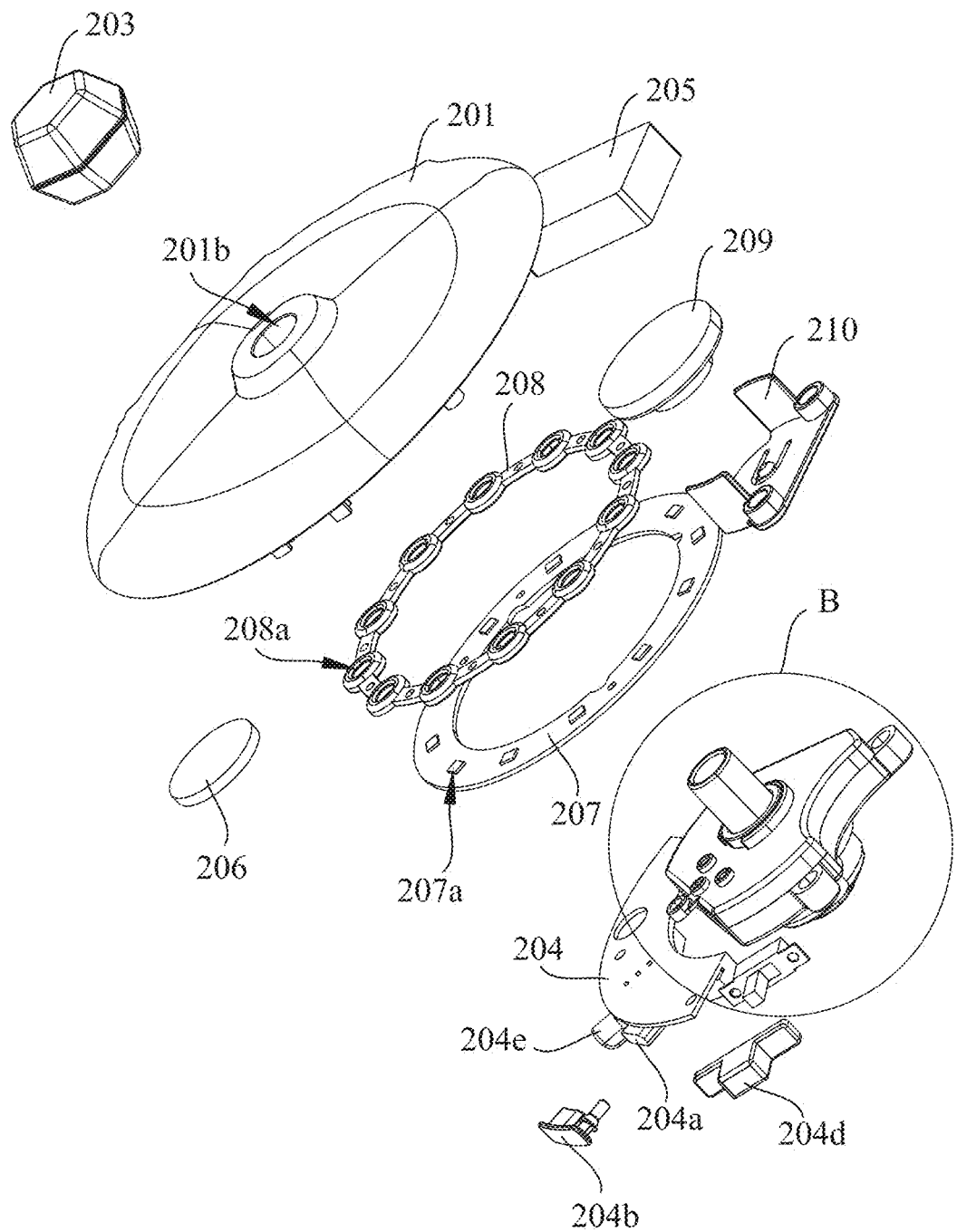
FIG. 6 is a partially exploded perspective view of the cap body in the toy atomization pot at a second angle according to an embodiment of the present disclosure.
Figure 7:
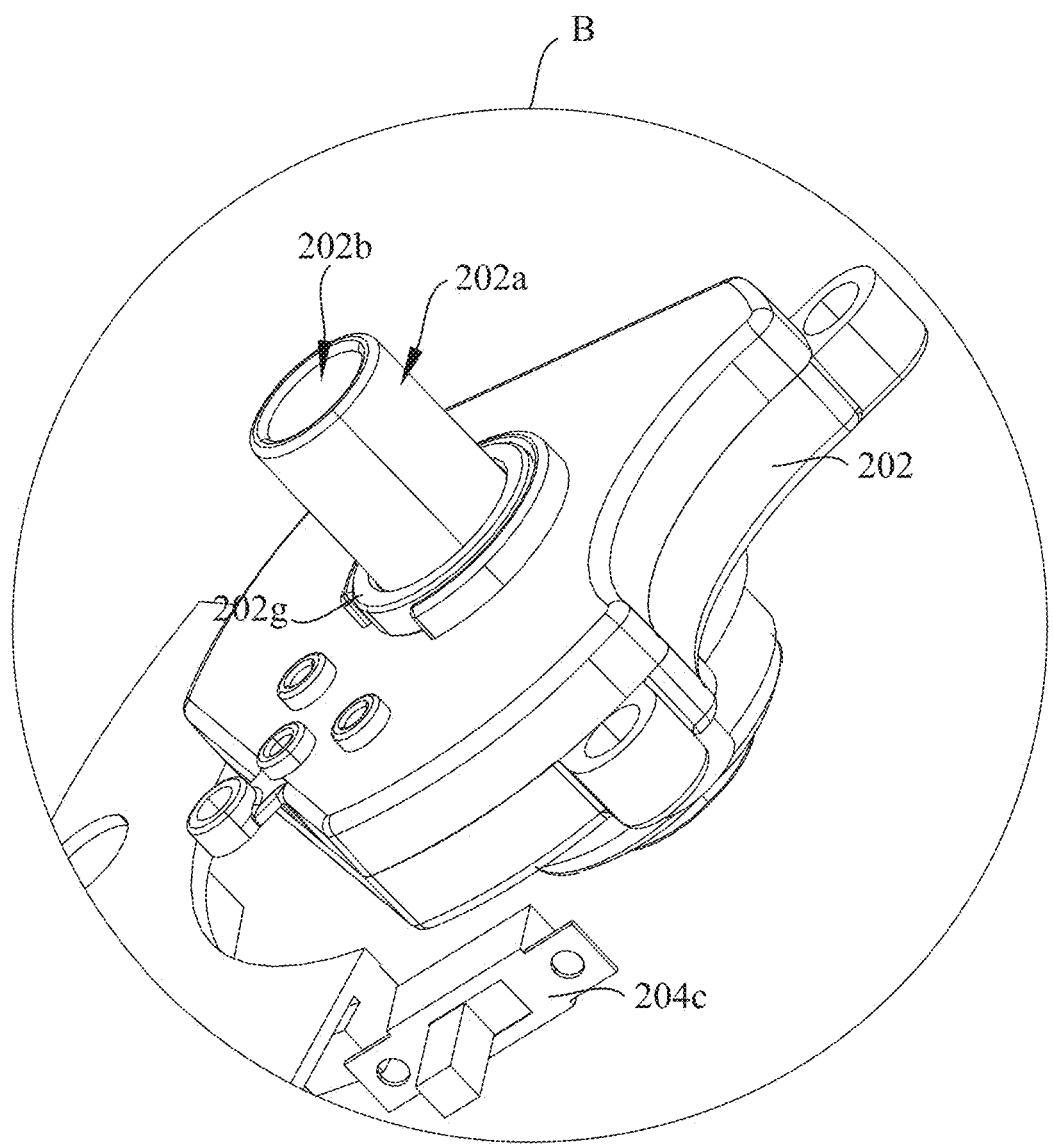
FIG. 7 is a partially enlarged perspective view of a portion B in FIG. 6.

As shown in FIG. 1 to FIG. 7, an embodiment of the present disclosure provides a toy atomization pot. The toy atomization pot includes a pot body 1, a cap body 2, and an inner container 101.

Specifically, the inner container 101 is detachably arranged inside the pot body 1, an accommodation space 101*b* is provided inside the inner container 101, and an opening 101*a* is provided in the top of the inner container 101, enabling the accommodation space 101*b* of the inner container 101 to communicate with the outside through the opening 101*a*. The cap body 2 is detachably fastened to the opening 101*a* of the inner container 101, enabling the cap body 2 to seal the accommodation space 101*b* of the inner container 101.

Specifically, the cap body 2 has a housing 201, a circuit board mounting groove 201*c* and a vibration switch mounting groove 201*f* are provided inside the housing 201, a control circuit board 204 is arranged in the circuit board mounting groove 201*c*, a toggle switch 204*c* and a tactile switch 204*e* are electrically connected to the control circuit board 204, the toggle switch 204*c* is configured to control the overall on/off state of the control circuit board 204 in the cap body 2, and a sound vibration switch 206 electrically connected to the control circuit board 204 is arranged in the vibration switch mounting groove 201*f*.

In some embodiments, a silica gel sleeve 204*d* is sleeved onto the toggle switch 204*c* to ensure the waterproof performance of the toggle switch 204*c*, thereby preventing a liquid from seeping through the toggle switch 204*c* to the control circuit board 204.

Specifically, a water tank mounting groove 201*a* is also provided inside the housing 201, a through hole 201*b* is provided in the bottom of the water tank mounting groove 201*a*, and a water storage tank 202 is arranged in the water tank mounting groove 201*a*. A water inlet tube 202*a* of the water storage tank 202 passes through the through hole 201*b* and then extends to a top side of the cap body 2. An atomizing sheet 202*d* is arranged at a water outlet 202*c* of the water storage tank 202 and electrically connected to the control circuit board 204 through the tactile switch 204*e* and the sound vibration switch 206. This allows that the liquid from the water outlet 202*c* of the water storage tank 202 may be atomized into mist by the atomizing sheet 202*d*, and the mist may be introduced into the accommodation space 101*b* of the inner container 101, when the cap body 2 is fastened to the opening 101*a* of the inner container 101, the toggle switch 204*c* is in an on state, the tactile switch 204*e* presses against the opening 101*a* of the inner container 101 to enable the tactile switch 204*c* to be in an on state, and the sound vibration switch 206 is in an on state.

In some embodiments, an adhesive injection groove 202*e* is provided at a connection between the water outlet 202*c* of the water storage tank 202 and the atomizing sheet 202*d*. After the atomizing sheet 202*d* is mounted onto the water outlet 202*c*, an adhesive may be injected into the adhesive injection groove 202*e* to ensure sealing performance between atomizing sheet 202*d* and the water outlet 202*c*, thereby preventing liquid leakage through the water outlet 202*c*.

In some embodiments, a first sealing ring 202f is also arranged at the connection between the water outlet 202c of the water storage tank 202 and the atomizing sheet 202d to further enhance the sealing performance at the connection between the water outlet 202c and the atomizing sheet 202d.

In some embodiments, the cap body 2 also has a cap handle 203. An insertion groove 203a is provided in the bottom of the cap handle 203. The insertion groove 203a fits the dimensions of the water inlet tube 202a of the water storage tank 202. This allows the cap handle 203 to be detachably inserted into a top end of the water inlet tube 202a through the insertion groove 203a, thereby allowing the cap handle 203 to seal a water filling port 202b of the water inlet tube 202a. The cap handle 203 may also allow a user to conveniently lift and carry the cap body 2.

In some embodiments, a second sealing ring 202g is arranged at a junction point between the insertion groove 203a and the water inlet tube 202a, thereby ensuring the sealing performance of the connection between the cap handle 203 and the water inlet tube 202a.

In some embodiments, a sealing stopper may also be arranged in the insertion groove 203a to further improve the sealing performance of the connection between the cap handle 203 and the water injection port 202b of the water storage tank 202.

Specifically, a light strip mounting groove 201d is also provided inside the housing 201. An annular light strip 207 is arranged in the light strip mounting groove 201d. A plurality of lamp beads 207a are uniformly distributed along the annular light strip 207. Each of the lamp bead 207a is electrically connected to the control circuit board 204 through the tactile switch 204c and the sound vibration switch 206. An annular strip 208 is also arranged on the annular light strip 207. Lampshades 208a corresponding to the plurality of lamp beads 207a are arranged on the annular strip 208. Each of the plurality of lampshades 208a covers the corresponding lamp bead 207a. When the cap body 2 is fastened to the opening 101a of the inner container 101, the toggle switch 204c is in the on state, the tactile switch 204c is in the on state, and the housing 201 is struck and then generates vibration, at this moment, the plurality of lamp beads 207a may turn on or off the sound vibration switch 206 in a preset sequence according to a preset program built in the control circuit board 204 and the number of vibrations generated by striking, allowing that the plurality of lamp beads 207a are controlled to be lighted up or turned off by the sound vibration switch 206.

In some embodiments, the lamp beads 207a may be multi-color Light-Emitting Diode (LED) beads 207a.

Specifically, a loudspeaker mounting groove 201g is also provided inside the housing 201. A loudspeaker 209 is arranged in the loudspeaker mounting groove 201g. The bottom of the loudspeaker 209 is detachably assembled with the housing 201 through a loudspeaker fixing rack 210, and the loudspeaker 209 is electrically connected to the control circuit board 204 through the tactile switch 204c and the sound vibration switch 206. When the cap body 2 is fastened to the opening 101a of the inner container 101, the toggle switch 204c is in the on state, the tactile switch 204c is in the on state, and the housing 201 is struck and then generates vibration, at this moment, the loudspeaker 209 may play a preset audio file in the control circuit board 204 according to the preset program built in the control circuit board 204 and the number of vibrations generated by striking.

Specifically, a battery mounting groove 201c is also provided inside the housing 201. A rechargeable battery 205 is arranged in the battery mounting groove 201e and electrically connected to the control circuit board 204 through the toggle switch 204c. A charging interface 204a is also provided in the control circuit board 204, and the rechargeable battery 205 may be charged through the charging interface 204a.

In some embodiments, a detachable silica gel stopper 204b is arranged at the charging interface 204a. When the toy atomization pot does not need to be charged, the silica gel stopper 204b may improve the waterproof performance of the charging interface 204a, thereby preventing the liquid from seeping through the charging interface 204a to the control circuit board 204.

In some embodiments, a plurality of annular holes 101c are provided in a circumferential side of the pot body 1. A pot handle 102 is hinged with each annular hole 101c. The pot handle 102 may allow the user to conveniently lift and carry the toy atomization pot.

It may be seen from the above description that, the above embodiments of the present disclosure achieve the following technical effects.

Compared with the prior art, the toy atomization pot provided in the embodiments of the present disclosure has functions of charging, lighting, sound, and atomization. These functions of lighting, sound and atomization are achieved through the toggle switch 204c, the tactile switch 204c, and the sound vibration switch 206, thereby greatly improving the playability.

Taking a preset program stored in the control circuit board 204 of the toy atomization pot as an example, the operating principle and steps of the toy atomization pot are as follows.

At S010, the inner container 101 is put in the pot body 1.

At S020, the cap handle 203 is dismantled from the cap body 2, and water is added to the water storage tank 202 through the water filling port 202b. After the water storage tank 202 is filled with the water, the cap handle 203 is inserted into the water inlet tube 202a again to seal the water filling port 202b, and then, the toggle switch 204c on the cap body 2 is turned on to switch the toggle switch to be in the on state.

At S030, the cap body 2 is fastened to the opening 101a of the inner container 101 until the cap body 2 seals the opening 101a of the inner container 101 and the tactile switch 204e presses against the opening 101a of the inner container 101, at this moment, the tactile switch 204c is in the on state. When the tactile switch 204e is triggered, the lamp beads 207a on the annular light strip 207 are sequentially lighted up in a marque pattern, accompanied by the loudspeaker 209 playing the preset audio file.

At S040, after the tactile switch 204e is turned on and the cap body 2 is left stationary for 2 seconds, striking the top side of the cap body 2 causes the sound vibration switch 206 to receive the vibration generated by striking, and then, the preset program in the control circuit board 204 starts counting. If the sound vibration switch 206 receives different numbers of striking within 5 seconds, the corresponding number of the lamp beads 207a on the annular light strip 207 is lighted up (for example, striking the cap body 2 for 3 times causes 3 lamp beads 207a on the annular light strip 207 to be lighted up; striking the cap body 2 for 4 times causes 4 lamp beads 207a on the annular light strip 207 to be lighted up; and so on).

At S050, after continuously striking the cap body 2 for 3 times and leaving it stationary for 3 seconds, the loudspeaker 209 plays the preset audio file, and the lamp beads 207a on the annular light strip 207 are sequentially lighted up with different colors in a marquee pattern; and at the same time, the atomizing sheet 202d is activated and sprays mist into the accommodation space 101b of the inner container 101 (the entire process lasts for 10 seconds).

At S060, after continuously striking a cap for 4 times and leaving it stationary for 3 seconds, the loudspeaker 209 plays a preset stirring sound effect, and the lamp beads 207a on the annular light strip 207 are all lighted up and display a color gradient; and at the same time, the atomizing sheet 202d is activated and sprays the mist into the accommodation space 101b of the inner container 101 (the entire process lasts for 15 seconds), with the color gradient speed of the lamp beads 207a increasing.

At S070, after continuously striking the cap for 5 times and leaving it stationary 3 seconds, the loudspeaker 209 plays a preset mixed-liquid boiling sound effect, and the lamp beads 207a on the annular light strip 207 are sequentially lighted up with different colors in a marquee pattern; and at the same time, the atomizing sheet 202d is activated and sprays the mist into the accommodation space 101b of the inner container 101 (the entire process lasts for 15 seconds).

At S080, after continuously striking the cap for 6 times and leaving it stationary for 3 seconds, the loudspeaker 209 plays a preset bubbling burst sound effect, and the lamp beads 207a on the annular light strip 207 are all lighted up with color gradient transitions; and at the same time, the atomizing sheet 202d is activated and sprays the mist into the accommodation space 101b of the inner container 101 (the entire process lasts for 20 seconds), with the color gradient speed of the lamp beads 207a increasing.

At S090, after continuously striking the cap for 7 times and leaving it stationary 3 seconds, the loudspeaker 209 plays a preset magic potion synthesis sound effect, the lamp beads 207a on the annular light strip 207 are all lighted up with a color gradient for the first 19 seconds and flash rapidly for the following 6 seconds; and at the same time, the atomizing sheet 202d is activated and sprays the mist into the accommodation space 101b of the inner container 101 (the entire process lasts for 25 seconds), with the color gradient speed of the lamp beads 207a increasing.

At S100, after S010 to S050 are executed, the tactile switch 204e must be triggered again before any other functions can be activated again. If the number of continuously striking within 5 seconds is less than 3 times or more than 7 times, the cap body 2 remains still for 5 seconds, the loudspeaker 209 plays a preset error sound effect, after which striking the cap body 2 may be allowed again.

The above are merely the preferred embodiments of the present disclosure and are not intended to limit the present disclosure. For those skilled in the art, the present disclosure may have various modifications and variations. Any modifications, equivalent replacements, improvements and the like made within the spirit and principle of the present disclosure shall fall within the scope of protection of the present disclosure.

What is claimed is:

1. A toy atomization pot, comprising:
a pot body, wherein a detachable inner container is arranged inside the pot body, an accommodation space is defined inside the inner container, a side of the accommodation space defines an opening, and the accommodation space is able to communicate with an outside through the opening; and
a cap body detachably arranged at the opening to seal the accommodation space, wherein
the cap body comprises:
a control circuit board;
a water storage tank defining a water outlet able to communicate with the accommodation space through the opening;
an atomizing sheet arranged at the water outlet and electrically connected to the control circuit board;
a plurality of lamp beads electrically connected to the control circuit board respectively;
a toggle switch electrically connected to the control circuit board and configured to switch the control circuit board on or off;
a sound vibration switch electrically connected to the control circuit board and configured to control the plurality of lamp beads and the atomizing sheet; and
a tactile switch electrically connected to the control circuit board and configured to control the plurality of lamp beads and the atomizing sheet; and
the tactile switch is in an on state and the sound vibration switch is in a triggerable state in response to the cap body sealing the opening and the toggle switch being in an on state.

2. The toy atomization pot according to claim 1, wherein:
the cap body comprises a housing; an inside of the housing defines a circuit board mounting groove, a vibration switch mounting groove, a water tank mounting groove, and a light strip mounting groove surrounding the water tank mounting groove, and a bottom of the water tank mounting groove defines a through hole;
the control circuit board is arranged in the circuit board mounting groove;
the sound vibration switch is arranged in the vibration switch mounting groove;
the water storage tank is arranged in the water tank mounting groove, and a water inlet tube of the water storage tank extends through the through hole to enable a water filling port of the water storage tank to communicate with the outside; and
the cap body further comprises an annular light strip, the annular light strip is arranged in the light strip mounting groove, and the plurality of lamp beads are uniformly distributed along the annular light strip.

3. The toy atomization pot according to claim 2, wherein:
the cap body further comprises a rechargeable battery, the inside the housing defines a battery mounting groove, and the rechargeable battery is arranged in the battery mounting groove and electrically connected to the control circuit board through the toggle switch; and
a charging interface is provided in the control circuit board and configured to charge the rechargeable battery.

4. The toy atomization pot according to claim 2, wherein:
the cap body further comprises a plurality of lampshades, the plurality of lampshades are in one-to-one correspondence with the plurality of lamp beads, and each of the plurality of lampshades covers the corresponding lamp bead.

5. The toy atomization pot according to claim 2, wherein:
the cap body further comprises a loudspeaker, the inside the housing defines a loudspeaker mounting groove, and the loudspeaker is arranged in the loudspeaker mounting groove and electrically connected to the control circuit board through the tactile switch and the sound vibration switch.

6. The toy atomization pot according to claim 2, wherein:
the cap body further comprises a cap handle, the water inlet tube extends through the through hole to a top side of the housing, and the cap handle is inserted into a top end of the water inlet tube to seal the water filling port.

7. The toy atomization pot according to claim 1, wherein:
a circumferential side of the pot body defines at least one annular hole, and a pot handle is hinged with each of the at least one annular hole.

* * * * *